(12) United States Patent
Yang et al.

(10) Patent No.: US 7,275,543 B2
(45) Date of Patent: Oct. 2, 2007

(54) COUPLER MEMBER FOR JOINING DISSIMILAR MATERIALS

(75) Inventors: Tahua Yang, Woodridge, IL (US); Michael T. K. Ling, Vernon Hills, IL (US); Sherwin Shang, Vernon Hills, IL (US)

(73) Assignees: Baxter International Inc., Deerfield, IL (US); Baxter Healthcare S.A., Zurich (CH)

( * ) Notice: Subject to any disclaimer, the term of this patent is extended or adjusted under 35 U.S.C. 154(b) by 742 days.

(21) Appl. No.: 10/251,681

(22) Filed: Sep. 20, 2002

(65) Prior Publication Data
US 2004/0059063 A1 Mar. 25, 2004

(51) Int. Cl.
*A61G 15/00* (2006.01)
(52) U.S. Cl. ...................................... 128/845; 128/849
(58) Field of Classification Search ........ 128/849–856; 428/36.9, 476.1, 516
See application file for complete search history.

(56) References Cited

U.S. PATENT DOCUMENTS

| | | | |
|---|---|---|---|
| 3,063,890 A | 11/1962 | Saumsiegle | |
| 3,542,712 A | 11/1970 | Gorton et al. | |
| 3,645,939 A | 2/1972 | Gaylord et al. | |
| 3,725,174 A | 4/1973 | Gaylord et al. | |
| 3,734,819 A | 5/1973 | Knutson | |
| 3,763,073 A | 10/1973 | Knutson | |
| 3,767,633 A | 10/1973 | Dietrich | |
| 3,956,230 A | 5/1976 | Gaylord | |
| 4,029,850 A | 6/1977 | Ishii et al. | |
| 4,037,020 A | 7/1977 | Ishii et al. | |
| 4,046,728 A | 9/1977 | Harmuth | |
| 4,071,494 A | 1/1978 | Gaylord | |
| 4,089,726 A | 5/1978 | Ishii et al. | |
| 4,126,504 A | 11/1978 | Wolinski et al. | |
| 4,210,567 A | 7/1980 | Kosters | |
| 4,230,774 A | 10/1980 | Watts et al. | |
| 4,316,832 A | 2/1982 | Walkden | |
| 4,322,516 A | 3/1982 | Wiest et al. | |
| 4,327,726 A | 5/1982 | Kwong et al. | |
| 4,369,779 A | 1/1983 | Spencer | |

(Continued)

FOREIGN PATENT DOCUMENTS

BR 9705844 6/1999

(Continued)

OTHER PUBLICATIONS

Web page http:--www.cellrobtics.com-perslasette.html printed on Aug. 3, 2001.

(Continued)

*Primary Examiner*—Michael A. Brown
(74) *Attorney, Agent, or Firm*—Ira D. Finkelstein; Paula Kelly; Robert Barrett

(57) ABSTRACT

The present invention provides a polymer blend having: a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

63 Claims, 1 Drawing Sheet

U.S. PATENT DOCUMENTS

| | | |
|---|---|---|
| 4,410,026 A | 10/1983 | Boggs et al. |
| 4,412,835 A | 11/1983 | Spencer |
| 4,417,753 A | 11/1983 | Bacehowski et al. |
| 4,439,192 A | 3/1984 | Leurink |
| 4,488,961 A | 12/1984 | Spencer |
| 4,495,312 A | 1/1985 | Hata et al. |
| 4,496,362 A | 1/1985 | Leurink |
| 4,507,119 A | 3/1985 | Spencer |
| 4,516,971 A | 5/1985 | Spencer |
| 4,516,977 A | 5/1985 | Herbert |
| 4,525,234 A | 6/1985 | Herold et al. |
| 4,587,289 A | 5/1986 | Comert |
| 4,601,948 A | 7/1986 | Lancaster et al. |
| 4,610,670 A | 9/1986 | Spencer |
| 4,619,642 A | 10/1986 | Spencer |
| 4,650,220 A | 3/1987 | Grabowski |
| 4,663,032 A | 5/1987 | Loos et al. |
| 4,664,658 A | 5/1987 | Sawada et al. |
| 4,687,474 A | 8/1987 | Takanashi |
| 4,707,389 A | 11/1987 | Ward |
| 4,720,524 A | 1/1988 | Ohmae et al. |
| 4,723,947 A | 2/1988 | Konopka |
| 4,725,641 A | 2/1988 | Comert et al. |
| 4,726,960 A | 2/1988 | Sawada et al. |
| 4,737,214 A | 4/1988 | Leurink et al. |
| 4,739,012 A | 4/1988 | Hagman |
| 4,740,017 A | 4/1988 | Grabowski |
| 4,753,697 A | 6/1988 | Spencer et al. |
| 4,770,735 A | 9/1988 | Spencer et al. |
| 4,771,106 A | 9/1988 | Ohmae et al. |
| 4,784,409 A | 11/1988 | Piechowiak |
| 4,793,880 A | 12/1988 | Shaposka et al. |
| 4,827,099 A | 5/1989 | Krebs et al. |
| 4,832,773 A | 5/1989 | Shaposka et al. |
| 4,848,801 A | 7/1989 | Grabowski |
| 4,864,101 A | 9/1989 | Spencer et al. |
| 4,865,902 A | 9/1989 | Golike et al. |
| 4,880,873 A | 11/1989 | Sagane |
| 4,897,138 A | 1/1990 | Spencer et al. |
| 4,900,771 A | 2/1990 | Gerace et al. |
| 4,913,756 A | 4/1990 | Spencer et al. |
| 4,927,184 A | 5/1990 | Bourjot et al. |
| 4,933,036 A | 6/1990 | Spencer et al. |
| 4,948,643 A | 8/1990 | Mueller |
| 4,997,430 A | 3/1991 | Van der Heiden et al. |
| 5,004,782 A | 4/1991 | Mashita et al. |
| 5,026,019 A | 6/1991 | Biekart et al. |
| 5,037,395 A | 8/1991 | Spencer |
| 5,039,768 A | 8/1991 | Gerace et al. |
| 5,061,451 A | 10/1991 | Ganshirt et al. |
| 5,088,994 A | 2/1992 | Porat et al. |
| 5,135,600 A | 8/1992 | Ishida |
| 5,141,592 A | 8/1992 | Spencer et al. |
| 5,156,701 A | 10/1992 | Spencer et al. |
| 5,158,630 A | 10/1992 | Spencer et al. |
| 5,166,269 A | 11/1992 | Wietsma et al. |
| 5,179,496 A | 1/1993 | Mimura |
| 5,188,697 A | 2/1993 | Lueghamer et al. |
| 5,209,800 A | 5/1993 | Spencer et al. |
| 5,224,937 A | 7/1993 | Van der Heiden |
| 5,244,522 A | 9/1993 | Spencer et al. |
| 5,248,359 A | 9/1993 | Spencer et al. |
| 5,248,562 A | 9/1993 | Palermo et al. |
| 5,250,607 A | 10/1993 | Comert et al. |
| 5,254,825 A | 10/1993 | Schippers |
| 5,256,229 A | 10/1993 | Spencer |
| 5,256,845 A | 10/1993 | Schippers |
| 5,272,304 A | 12/1993 | Been et al. |
| 5,274,035 A | 12/1993 | Chundury |
| 5,279,685 A | 1/1994 | Spencer et al. |
| 5,324,233 A | 6/1994 | Owensby et al. |
| 5,336,351 A | 8/1994 | Meyers |
| 5,342,345 A | 8/1994 | Spencer |
| 5,356,709 A | 10/1994 | Woo et al. |
| 5,367,010 A | 11/1994 | Gervase et al. |
| 5,368,586 A | 11/1994 | Van Der Heiden et al. |
| 5,371,767 A | 12/1994 | Pirl |
| 5,385,979 A | 1/1995 | Osawa et al. |
| D355,848 S | 2/1995 | Spencer et al. |
| 5,391,610 A | 2/1995 | Comert et al. |
| 5,397,425 A | 3/1995 | Spencer et al. |
| 5,407,742 A | 4/1995 | Tavss et al. |
| 5,410,131 A | 4/1995 | Brunet et al. |
| D357,926 S | 5/1995 | Spencer et al. |
| 5,439,454 A | 8/1995 | Lo et al. |
| 5,460,625 A | 10/1995 | Johnson |
| 5,464,496 A | 11/1995 | Wilson et al. |
| 5,476,718 A | 12/1995 | Ichizuka et al. |
| 5,484,375 A | 1/1996 | Owensby et al. |
| 5,486,210 A | 1/1996 | Kerr et al. |
| 5,492,963 A | 2/1996 | Ozawa et al. |
| 5,496,291 A | 3/1996 | Spencer |
| 5,518,575 A | 5/1996 | Watanabe |
| 5,520,218 A | 5/1996 | Hlavinka et al. |
| 5,525,186 A | 6/1996 | Spencer et al. |
| 5,532,053 A | 7/1996 | Mueller |
| 5,534,591 A | 7/1996 | Ozawa et al. |
| 5,554,253 A | 9/1996 | Watanabe |
| 5,601,889 A | 2/1997 | Chundury et al. |
| 5,620,738 A | 4/1997 | Fan et al. |
| 5,632,852 A | 5/1997 | Spencer et al. |
| 5,656,345 A | 8/1997 | Strand et al. |
| 5,674,333 A | 10/1997 | Spencer |
| 5,686,527 A | 11/1997 | Laurin et al. |
| 5,733,268 A | 3/1998 | Spencer |
| 5,749,414 A | 5/1998 | Damsohn et al. |
| 5,802,689 A | 9/1998 | Sano |
| 5,810,792 A | 9/1998 | Fangrow et al. |
| 5,821,293 A | 10/1998 | Roesch et al. |
| 5,824,724 A | 10/1998 | Roesch et al. |
| 5,837,358 A * | 11/1998 | Bauer et al. ................ 428/213 |
| 5,849,843 A | 12/1998 | Laurin et al. |
| 5,854,347 A | 12/1998 | Laurin et al. |
| 5,855,731 A | 1/1999 | Spencer |
| 5,871,612 A | 2/1999 | Spencer |
| 5,877,236 A | 3/1999 | Roesch et al. |
| 5,879,318 A | 3/1999 | Van Der Heiden et al. |
| 5,891,461 A * | 4/1999 | Jona et al. ................... 424/449 |
| 5,919,173 A | 7/1999 | Spencer |
| 5,921,587 A | 7/1999 | Lueghamer |
| 5,922,798 A | 7/1999 | Roesch et al. |
| 5,928,216 A | 7/1999 | Spencer |
| 5,935,847 A | 8/1999 | Smith et al. |
| 5,964,261 A | 10/1999 | Neuenfeldt et al. |
| 5,968,380 A | 10/1999 | Hayashi |
| 5,993,949 A | 11/1999 | Smith et al. |
| 5,998,019 A | 12/1999 | Rosenbaum et al. |
| 6,004,311 A | 12/1999 | Heilmann et al. |
| 6,004,417 A | 12/1999 | Roesch et al. |
| 6,022,344 A | 2/2000 | Meijer |
| 6,024,220 A | 2/2000 | Smith et al. |
| 6,026,882 A | 2/2000 | Yamada et al. |
| 6,071,690 A | 6/2000 | Spencer |
| 6,083,584 A | 7/2000 | Smith et al. |
| 6,094,969 A | 8/2000 | Loos et al. |
| 6,132,833 A | 10/2000 | Spencer |
| 6,149,997 A | 11/2000 | Patel et al. |
| 6,168,862 B1 | 1/2001 | Rosenbaum et al. |
| 6,225,404 B1 | 5/2001 | Sorensen et al. |
| 6,251,202 B1 | 6/2001 | Murphy |
| 6,261,655 B1 | 7/2001 | Rosenbaum et al. |
| 6,270,599 B1 | 8/2001 | Wood |
| 6,293,594 B1 | 9/2001 | Safarevich et al. |
| 6,296,730 B1 | 10/2001 | Williams et al. |

| | | | |
|---|---|---|---|
| 6,297,046 B1 | 10/2001 | Smith et al. | |
| 6,299,596 B1 | 10/2001 | Ding | |
| 6,302,151 B1 | 10/2001 | Maitay | |
| 6,308,882 B1 | 10/2001 | Shuster et al. | |
| 6,333,122 B1 | 12/2001 | Furukawa et al. | |
| 6,368,315 B1 | 4/2002 | Gillis et al. | |
| 6,399,704 B1 | 6/2002 | Laurin et al. | |
| 6,465,068 B1 | 10/2002 | Patel et al. | |
| 6,869,653 B2 * | 3/2005 | Ling et al. | 428/36.9 |
| 6,913,056 B2 | 7/2005 | Landherr et al. | |
| 2003/0124278 A1 * | 7/2003 | Clark et al. | 428/35.7 |

FOREIGN PATENT DOCUMENTS

| | | |
|---|---|---|
| CA | 1205783 | 6/1986 |
| CN | 1052131 | 6/1991 |
| DE | 3 734 170 | 4/1989 |
| EP | 307546 | 3/1989 |
| EP | 0347794 | 12/1989 |
| EP | 0 406 485 A | 1/1991 |
| EP | 418772 | 3/1991 |
| EP | 0 583 582 A1 | 2/1994 |
| EP | 0 619 175 A2 | 10/1994 |
| EP | 0 508 251 B1 | 8/1995 |
| EP | 0 689 846 A1 | 1/1996 |
| EP | 0 723 851 A2 | 7/1996 |
| EP | 0 725 134 A2 | 8/1996 |
| EP | 564231 B1 | 5/1997 |
| EP | 0 515 811 B1 | 8/2000 |
| EP | 1 064 960 A2 | 1/2001 |
| FR | 1471450 | 3/1967 |
| JP | 46042639 | 12/1971 |
| JP | 72044977 | 11/1972 |
| JP | 48089236 | 11/1973 |
| JP | 75016826 | 6/1975 |
| JP | 53014772 A | 2/1978 |
| JP | 57150533 | 9/1982 |
| JP | 58124648 | 7/1983 |
| JP | 58132552 | 8/1983 |
| JP | 62244614 | 10/1987 |
| JP | 63126709 | 5/1988 |
| JP | 1210486 | 8/1989 |
| JP | 2113052 | 4/1990 |
| JP | 02269753 A2 | 11/1990 |
| JP | 3120042 | 5/1991 |
| JP | 3177682 | 8/1991 |
| JP | 4208419 | 7/1992 |
| JP | 5042640 | 2/1993 |
| JP | 5124146 | 5/1993 |
| JP | 6-91010 | 4/1994 |
| JP | 6-91011 | 4/1994 |
| JP | 6-233817 | 8/1994 |
| JP | 08003526 A2 | 1/1996 |
| JP | 08003527 A2 | 1/1996 |
| JP | 08295862 A2 | 11/1996 |
| JP | P2000-126288 A | 5/2000 |
| JP | 2000170967 | 6/2000 |
| JP | 2000301592 | 10/2000 |
| JP | 2000344852 A2 | 12/2000 |
| JP | 2002146303 A2 | 5/2002 |
| NL | 8 101 391 | 10/1982 |
| WO | WO 8300699 | 3/1983 |
| WO | 9314810 | 8/1993 |
| WO | WO 9315908 A1 | 8/1993 |
| WO | 95/06684 | 3/1995 |
| WO | WO 9604704 | 2/1996 |
| WO | WO 9836902 A1 | 8/1998 |
| WO | WO 9924242 A1 | 5/1999 |
| WO | WO 200005316 | 2/2000 |
| WO | 00/43189 | 7/2000 |
| WO | WO 200146332 A1 | 6/2001 |
| WO | WO 200160586 A1 | 8/2001 |
| WO | WO 200162314 A2 | 8/2001 |
| WO | WO 200166662 | 9/2001 |
| WO | WO 200185417 | 11/2001 |

OTHER PUBLICATIONS

Web page http:--www.laserweld.com-laser-welding.html printed on Mar. 21, 2001.
Web page http:--www.coherentic.com-html-about.html printed on Mar. 21, 2001.
Web page www.dencoted.com.
LaseRevolution, Inc. web page printed Mar. 21, 2001.
Joining Technologies LLC web page, "Electron Beam Welding", printed Mar. 20, 2001.
Ebeam web page printed Mar. 20, 2001.
Dimetrics,Inc. web page printed Mar. 20, 2001.
MPW web page printed Mar. 20, 2001.
Fresenius HemoCare, Inc. web page printed Jun. 6, 2002.
Joining Technologies web page, "Weld Joint Design", printed Mar. 21, 2001.
Electrox—Manufacturing Solutions web page printed Mar. 21, 2001.
TWI Technology web page printed Mar. 21, 2001.
Joining Technologies, "Laser Beam Welding", printed Mar. 21, 2001.
Search Report dated Jul. 5, 2002.
US 5,693,387, 12/1997, Rosenbaum et al. (withdrawn)

* cited by examiner

COUPLER MEMBER FOR JOINING DISSIMILAR MATERIALS

CROSS-REFERENCE TO RELATED APPLICATIONS

Not Applicable.

FEDERALLY SPONSORED RESEARCH OR DEVELOPMENT

Not Applicable.

BACKGROUND OF THE INVENTION

Many disposable medical devices such as continuous ambulatory peritoneal dialysis (CAPD) disposable sets, blood bags, I.V. solution containers, therapeutic fluid delivery sets, administrative sets for blood, and the like are made of a flexible, collapsible polyvinyl chloride plastic. Alternatively, polyolefin type and other materials have been proposed for use as a substitute for polyvinyl chloride plastic. See, for example, Gajewski et al., U.S. Pat. No. 4,140,162, which discloses polyolefin-type blends for making flexible, collapsible containers.

It may be desirable in many instances to manufacture products, for example medical devices, in which some of the device is made of one type of plastic, for example a polyolefin, while another part of the device is made of a different type of plastic such as polyvinyl chloride. For example, it may be desirable for blood bag made from PVC to be connected to an administration set of a polyvinyl chloride formulation. It may also be desirable to connect a tubing segment of PVC to a non-PVC tubing.

Unfortunately, PVC is adhesively incompatible with most polyolefin-type materials, so that the maintenance of a sealed, sterile connection between the incompatible materials is a substantial technical problem.

Attempts have been made to solve this by various mechanical seals, for example, see Vcelka and Winchell U.S. Pat. No. 4,049,034. However, these mechanical techniques for sealing incompatible materials all involve structure having increased complexity and expense over simpler seals, usable when the materials to be sealed are compatible.

Coupling devices have also been fabricated from polymeric blends for connecting incompatible materials. For example, U.S. Pat. No. 4,327,726 discloses a polymer blend of 13% polypropylene, 35% polyester elastomer (Hytrel), 13% ethylene vinyl acetate copolymer and 39% SEBS. This polymer blend can be molded into a connector which is capable of simultaneously sealing to both PVC and polyolefin plastics.

In Canadian Patent No. 1,194,246 discloses a polymer blend for making a coupler for joining PVC to polyolefin materials. The polymer blend has from 1-8% polypropylene, 35%55% polyester elastomer (Hytrel), 0-15% EVA and 40-65% SEBS.

In accordance with this invention, polymer blends are disclosed which are capable of being formed into a connector member for sealing to both PVC and polyolefin plastics, or other adhesively incompatible materials.

As a result of this, various devices, and specifically medical devices, may be fabricated with various parts made of dissimilar materials and connected together in accordance with this invention.

SUMMARY OF THE INVENTION

The present invention provides a polymer blend having: a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

The present invention further provides an article for joining a first tubing of a first material to a second tubing of a second material where the second material is incompatible with the first tubing. The articles has a body of a first polymer blend having: a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

The present invention further provides a polymer blend having two components. A first component is selected from polyesters, polyester elastomers, and polyurethanes. The first component is present in an amount by weight of the blend of from about 40% to about 60%. A second component of the blend is an ethylene vinyl acetate copolymer in an amount by weight of the blend from about 60% to about 40%.

The present invention further provides a multilayer film having a first layer of a first material, a second layer of a second material that is adhesively incompatible with the first layer; and a third layer joining the first layer to the second layer. The third layer of a blend having: a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

These and other aspects and attributes of the present invention will be discussed with reference to the following drawings and accompanying specification.

DETAILED DESCRIPTION OF THE INVENTION

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

The present invention provides a coupler for joining together two adhesively incompatible materials. The coupler is particularly well suited for use in connecting components of a therapeutic fluid delivery systems where the components are made from dissimilar and/or adhesively incompatible materials. What is meant by adhesively incompatible is the materials are not capable of being joined together directly to one another by standard heat sealing techniques to form a sufficiently strong connection to serve its intended purpose. In one preferred form of the invention the coupler is used to connect components made from PVC with components made from non-PVC materials. The coupler can also be used to connect two components from different non-PVC materials that are adhesively incompatible with one another.

Figure 1:
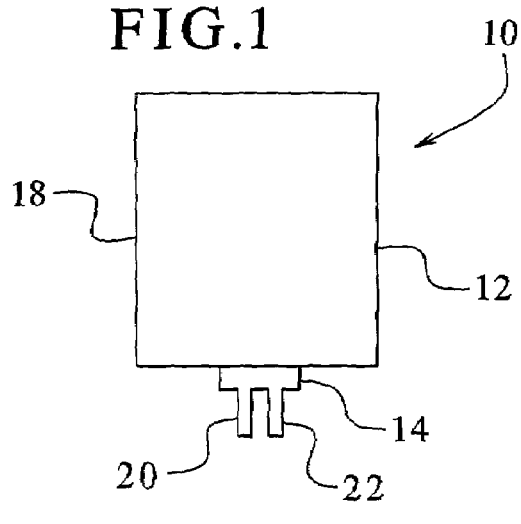
FIG. 1 is a plan view of a therapeutic fluids delivery container with administration port.
Figure 2:
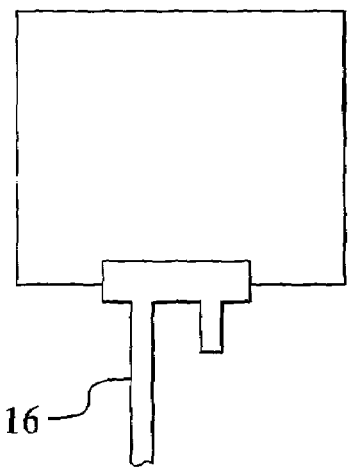
FIG. 2 is a plan view of the container of claim 1 with a fluid administration tubing connected thereto.

FIG. 1 shows a therapeutic fluid container system 10 having a container 12 and an administration port 14. FIG. 2 shows a tubing 16 connected to the administration port 14. In a preferred form of the invention, the container 12 is made from a flexible polymeric material. The polymeric material can be provided in sheet form and two sheets can be placed in registration and sealed about its periphery to form a fluid tight chamber 18 for holding therapeutic fluids. The container 12 can also be formed from a blown tube where only two ends have to be sealed to form the container. The term therapeutic fluid is meant to include any fluid having a potentially beneficial effect for treating a patient and includes, but is not limited to, I.V. fluids such as saline or dextrose solutions, drug containing solution, solutions for CAPD therapy, blood, blood components, blood substitutes and the like.

The polymeric material for fabricating the container can be from PVC containing materials and non-PVC containing materials. While there is a general trend in the industry to move away from the use of PVC in medical containers, PVC has been found to be particularly well suited to contain blood as red blood cells have a longer shelf life in PVC containers when compared to many other materials. Suitable non-PVC polymer blends and films for fabricating medical containers include, for example, those described in U.S. Pat. Nos. 5,849,843 and 5,998,019 which are incorporated herein by reference and made a part hereof.

The tubing segment 16 shown can be a part of a fluid administration set such as an I.V. administration set, a blood administration or collection set or a CAPD administration set to name a few. The tubing is preferably made from a non-PVC polymer such as a polyolefin based polymer. The tubing set can be heat sealed to the administration port 14 using standard heat sealing techniques well known in the art.

The administration port 14 is shown having two connection members 20 and 22, however, it should be understood the administration port 14 could have fewer or greater connection members without departing from the scope of the present invention. The administration port 14 is fabricated from a polymeric blend that is compatible with the material of the container and the material of the tubing 16, and, therefore, is an example of a coupler of the present invention. The administration port can be fabricated from the polymeric blend by any suitable polymer processing technique and most preferably by injection molding.

In a preferred form of the invention, the administration port is composed of a polymer blend. In one preferred form of the invention the blend has two components of from about 40% to about 60% EVA and a second component of from about 60% to about 40% of a polyester, polyester elastomer, or a polyurethane. The EVA, preferably, has a modifier group associated therewith and selected from the group consisting of: aromatic hydrocarbons, carbon dioxide, monoethylenically unsaturated hydrocarbons, acrylonitriles, vinyl ethers, vinyl esters, vinylamides, vinyl ketones, vinyl halides, epoxides, carboxylic acids and anhydride derivatives thereof (including fused ring carboxylic acid anhydrides). Most preferably, the modifier group is maleic acid or maleic anhydride.

In another preferred form of the invention, the polymer blend has three components. The first component is a polyolefin and more preferably, a propylene containing polymer in an amount by weight of from about 25% to about 35% such as those sold by Solvay under the trade name FORTILENE and most particularly FORTILENE grade KS 490. The second component is a polyester and more preferably, a polyester elastomer such as those sold by DuPont under the tradename HYTREL® and in an amount by weight of the blend of from about 35% to about 45%. The second component can also be a polyurethane. The third component is an ethylene vinyl acetate copolymer having a vinyl acetate content of from about 8% vinyl acetate to about 40% vinyl acetate, and more preferably a carboxylic acid modified EVA or a carboxylic acid anhydride modified EVA. The EVA is present in an amount by weight of the blend of from about 25% to about 35%. The present invention further contemplates modifying the propylene component with an acid, a carboxylic acid or a carboxylic acid anhydride instead of or in addition to such modification to the EVA.

Suitable polyurethanes include both aromatic and aliphatic type polyurethanes. Suitable polyurethanes are formed by reacting diisocyanate with a chain extender. Diisocyanates include: Diphenylmethane diisocyanate (MDI), toluene diisocyanate (TDI), hexylene diisocyanate (HDI), and isophorone diisocyanate (IPDI). Chain Extenders include diol type, diamine type, polyester containing polyols and polyether containing polyols. The diol type include: 1,4-butane diol, ethylene glycol, 1,6-hexane diol and 1,4-bis-betahydroxyethoxybenzene. The diamine type include aliphatic and aromatic type. Aliphatic type includes ethylene diamine. Aromatic type includes: toluylene diamine and diaminodiphenylmethane.

Suitable non-PVC containing polymers include polyolefins, ethylene and lower alkyl acrylate copolymers, ethylene and lower alkyl substituted alkyl acrylate copolymers, ethylene vinyl acetate copolymers, polybutadienes, polyesters, polyamides, and styrene and hydrocarbon copolymers.

Suitable polyolefins include homopolymers and copolymers obtained by polymerizing alpha-olefins containing from 2 to 20 carbon atoms, and more preferably from 2 to 10 carbons. Therefore, suitable polyolefins include polymers and copolymers of propylene, ethylene, butene-1, pentene-1, 4-methyl-1-pentene, hexene-1, heptene-1, octene-1, nonene-1 and decene-1. Most preferably the polyolefin is a homopolymer or copolymer of propylene or a homopolymer or copolymer of polyethylene.

Suitable homopolymers of polypropylene can have a stereochemistry of amorphous, isotactic, syndiotactic, atactic, hemiisotactic or stereoblock. In a more preferred form of the invention, the polypropylene will have a low heat of fusion from about 20 joules/gram to about 220 joules/gram, more preferably from about 60 joules/gram to about 160 joules/gram and most preferably from about 80 joules/gram to about 130 joules/gram. It is also desirable, in a preferred form of the invention, for the polypropylene homopolymer to have a melting point temperature of less than about 165° C. and more preferably from about 130° C. to about 160° C., more preferably from about 140° C. to about 150° C. In one preferred form of the invention the homopolymer of polypropylene is obtained using a single site catalyst.

Suitable copolymers of propylene are obtained by polymerizing a propylene monomer with an α-olefin having from 2 to 20 carbons. In a more preferred form of the invention, the propylene is copolymerized with ethylene in an amount by weight from about 1% to about 20%, more preferably from about 1% to about 10% and most preferably from 2% to about 5% by weight of the copolymer. The propylene and ethylene copolymers may be random or block copolymers. The propylene copolymer should have a low heat of fusion of from about 40 joules/gram to about 140 joules/gram, more preferable from about 60 joules/gram to about 90 joules/gram. In a preferred form of the invention, the propylene copolymer is obtained using a single-site catalyst.

It is also possible to use a blend of polypropylene and α-olefin copolymers wherein the propylene copolymers can vary by the number of carbons in the α-olefin. For example, the present invention contemplates blends of propylene and α-olefin copolymers wherein one copolymer has a 2 carbon α-olefin and another copolymer has a 4 carbon α-olefin. It is also possible to use any combination of α-olefins from 2 to 20 carbons and more preferably, from 2 to 8 carbons. Accordingly, the present invention contemplates blends of propylene and α-olefin copolymers wherein a first and second α-olefins have the following combination of carbon numbers: 2 and 6, 2 and 8, 4 and 6, 4 and 8. It is also contemplated using more than 2 polypropylene and α-olefin copolymers in the blend. Suitable polymers can be obtained using a catalloy procedure.

It may also be desirable to use a high melt strength polypropylene. High melt strength polypropylenes can be a homopolymer or copolymer of polypropylene having a melt flow index within the range of 10 grams/10 min. to 800 grams/10 min., more preferably 30 grams/10 min. to 200 grams/10 min, or any range or combination of ranges therein. High melt strength polypropylenes are known to have free-end long chain branches of propylene units. Methods of preparing polypropylenes which exhibit a high melt strength characteristic have been described in U.S. Pat. Nos. 4,916,198; 5,047,485; and 5,605,936 which are incorporated herein by reference and made a part hereof. One such method includes irradiating a linear propylene polymer in an environment in which the active oxygen concentration is about 15% by volume with high energy ionization energy radiation at a dose of 1 to $10^4$ megarads per minute for a period of time sufficient for a substantial amount of chain scission of the linear propylene polymer to occur but insufficient to cause the material to become gelatinous. The irradiation results in chain scission. The subsequent recombination of chain fragments results in the formation of new chains, as well as joining chain fragments to chains to form branches. This further results in the desired free-end long chain branched, high molecular weight, non-linear, propylene polymer material. Radiation is maintained until a significant amount of long chain branches form. The material is then treated to deactivate substantially all the free radicals present in the irradiated material.

High melt strength polypropylenes can also be obtained as described in U.S. Pat. No. 5,416,169, which is incorporated in its entirety herein by reference and made a part hereof, when a specified organic peroxide (di-2-ethylhexyl peroxydicarbonate) is reacted with a polypropylene under specified conditions, followed by melt-kneading. Such polypropylenes are linear, crystalline polypropylenes having a branching coefficient of substantially 1, and, therefore, has no free end long-chain branching and will have a intrinsic viscosity of from about 2.5 dl/g to 10 dl/g.

Suitable homopolymers of ethylene include those having a density of greater than 0.915 g/cc and includes low density polyethylene (LDPE), medium density polyethylene (MDPE) and high density polyethylene (HDPE).

Suitable copolymers of ethylene are obtained by polymerizing ethylene monomers with an α-olefin having from 3 to 20 carbons, more preferably 3-10 carbons and most preferably from 4 to 8 carbons. It is also desirable for the copolymers of ethylene to have a density as measured by ASTM D-792 of less than about 0.915 g/cc and more preferably less than about 0.910 g/cc and even more preferably less than about 0.900 g/cc. Such polymers are oftentimes referred to as VLDPE (very low density polyethylene) or ULDPE (ultra low density polyethylene). Preferably the ethylene α-olefin copolymers are produced using a single site catalyst and even more preferably a metallocene catalyst systems. Single site catalysts are believed to have a single, sterically and electronically equivalent catalyst position as opposed to the Ziegler-Natta type catalysts which are known to have a mixture of catalysts sites. Such single-site catalyzed ethylene α-olefins are sold by Dow under the trade name AFFINITY, DuPont Dow under the trademark ENGAGE® and by Exxon under the trade name EXACT. These copolymers shall sometimes be referred to herein as m-ULDPE.

Suitable copolymers of ethylene also include ethylene and lower alkyl acrylate copolymers, ethylene and lower alkyl substituted alkyl acrylate copolymers and ethylene vinyl acetate copolymers having a vinyl acetate content of from about 8% to about 40% by weight of the copolymer. The term "lower alkyl acrylates" refers to comonomers having the formula set forth in Diagram 1:

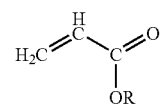

Diagram 1

The R group refers to alkyls having from 1 to 17 carbons. Thus, the term "lower alkyl acrylates" includes but is not limited to methyl acrylate, ethyl acrylate, butyl acrylate and the like.

The term "alkyl substituted alkyl acrylates" refers to comonomers having the formula set forth in Diagram 2:

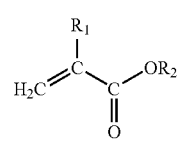

Diagram 2

$R_1$ and $R_2$ are alkyls having 1-17 carbons and can have the same number of carbons or have a different number of carbons. Thus, the term "alkyl substituted alkyl acrylates" includes but is not limited to methyl methacrylate, ethyl methacrylate, methyl ethacrylate, ethyl ethacrylate, butyl methacrylate, butyl ethacrylate and the like.

Suitable polybutadienes include the 1,2- and 1,4-addition products of 1,3-butadiene (these shall collectively be referred to as polybutadienes). In a more preferred form of the invention, the polymer is a 1,2-addition product of 1,3 butadiene (these shall be referred to as 1,2 polybutadienes). In an even more preferred form of the invention, the polymer of interest is a syndiotactic 1,2-polybutadiene and even more preferably a low crystallinity, syndiotactic 1,2 polybutadiene. In a preferred form of the invention the low crystallinity, syndiotactic 1,2 polybutadiene will have a crystallinity less than 50%, more preferably less than about 45%, even more preferably less than about 40%, even more preferably, the crystallinity will be from about 13% to about 40%, and most preferably from about 15% to about 30%. In a preferred form of the invention the low crystallinity, syndiotactic 1,2 polybutadiene will have a melting point temperature measured in accordance with ASTM D 3418 from about 70° C. to about 120° C. Suitable resins include those sold by JSR (Japan Synthetic Rubber) under the grade designations: JSR RB 810, JSR RB 820, and JSR RB 830.

Suitable polyesters include polycondensation products of di- or polycarboxylic acids and di or poly hydroxy alcohols or alkylene oxides. In a preferred form of the invention, the polyester is a polyester ether. Suitable polyester ethers are obtained from reacting 1,4 cyclohexane dimethanol, 1,4 cyclohexane dicarboxylic acid and polytetramethylene glycol ether and shall be referred to generally as PCCE. Suitable PCCE's are sold by Eastman under the trade name ECDEL. Suitable polyesters further include polyester elastomers which are block copolymers of a hard crystalline segment of polybutylene terephthalate and a second segment of a soft (amorphous) polyether glycols. Such polyester elastomers are sold by Du Pont Chemical Company under the trade name HYTREL®.

Suitable polyamides include those that result from a ring-opening reaction of lactams having from 4-12 carbons. This group of polyamides therefore includes nylon 6, nylon 10 and nylon 12. Acceptable polyamides also include aliphatic polyamides resulting from the condensation reaction of di-amines having a carbon number within a range of 2-13, aliphatic polyamides resulting from a condensation reaction of di-acids having a carbon number within a range of 2-13, polyamides resulting from the condensation reaction of dimer fatty acids, and amide containing copolymers. Thus, suitable aliphatic polyamides include, for example, nylon 66, nylon 6,10 and dimer fatty acid polyamides.

The styrene of the styrene and hydrocarbon copolymer includes styrene and the various substituted styrenes including alkyl substituted styrene and halogen substituted styrene. The alkyl group can contain from 1 to about 6 carbon atoms. Specific examples of substituted styrenes include alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the most preferred.

The hydrocarbon portion of the styrene and hydrocarbon copolymer includes conjugated dienes. Conjugated dienes which may be utilized are those containing from 4 to about 10 carbon atoms and more generally, from 4 to 6 carbon atoms. Examples include 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used such as mixtures of butadiene and isoprene. The preferred conjugated dienes are isoprene and 1,3-butadiene.

The styrene and hydrocarbon copolymers can be block copolymers including di-block, tri-block, multi-block, and star block. Specific examples of diblock copolymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, and alpha-methylstyrene-isoprene-alpha-methylstyrene and hydrogenated derivatives thereof.

The selective hydrogenation of the above block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference and made a part hereof.

Particularly useful hydrogenated block copolymers are the hydrogenated block copolymers of styrene-isoprene-styrene, such as a styrene-(ethylene/propylene)-styrene block polymer. When a polystyrene-polybutadiene-polystyrene block copolymer is hydrogenated, the resulting product resembles a regular copolymer block of ethylene and 1-butene (EB). As noted above, when the conjugated diene employed is isoprene, the resulting hydrogenated product resembles a regular copolymer block of ethylene and propylene (EP). One example of a commercially available selectively hydrogenated is KRATON G-1652 which is a hydrogenated SBS triblock comprising 30% styrene end blocks and a midblock equivalent is a copolymer of ethylene and 1-butene (EB). This hydrogenated block copolymer is often referred to as SEBS. Other suitable SEBS or SIS copolymers are sold by Kurrarry under the tradename SEPTON® and HYBRAR®.

It may also be desirable to use graft modified styrene and hydrocarbon block copolymers by grafting an alpha,beta-unsaturated monocarboxylic or dicarboxylic acid reagent onto the selectively hydrogenated block copolymers described above.

The block copolymers of the conjugated diene and the vinyl aromatic compound are grafted with an alpha,beta-unsaturated monocarboxylic or dicarboxylic acid reagent. The carboxylic acid reagents include carboxylic acids per se and their functional derivatives such as anhydrides, imides, metal salts, esters, etc., which are capable of being grafted onto the selectively hydrogenated block copolymer. The grafted polymer will usually contain from about 0.1 to about 20%, and preferably from about 0.1 to about 10% by weight based on the total weight of the block copolymer and the carboxylic acid reagent of the grafted carboxylic acid. Specific examples of useful monobasic carboxylic acids include acrylic acid, methacrylic acid, cinnamic acid, crotonic acid, acrylic anhydride, sodium acrylate, calcium acrylate and magnesium acrylate, etc. Examples of dicarboxylic acids and useful derivatives thereof include maleic acid, maleic anhydride, fumaric acid, mesaconic acid, itaconic acid, citraconic acid, itaconic anhydride, citraconic anhydride, monomethyl maleate, monosodium maleate, etc.

The styrene and hydrocarbon block copolymer can be modified with an oil such as the oil modified SEBS sold by the Shell Chemical Company under the product designation KRATON G2705.

In one preferred form of the invention, the tubing is composed of a multiple component polymer blend. The present invention contemplates blending two or more of any of the polymers set forth above. In a preferred form of the invention, the polymer blend includes a polyolefin blended with a styrene and hydrocarbon copolymer. In a preferred form of the invention, the polyolefin is a propylene containing polymer and can be selected from the homopolymers and copolymers of propylene described above including high melt strength polypropylenes. It may also be desirable to have three or more components including a styrene and hydrocarbon copolymer with a blend of various types of polypropylenes. The polypropylene, either alone or in sum, can be present in an amount by weight of the blend from about 10% to about 50%, more preferably from about 15% to about 45% and most preferably from about 20% to about 40% with the balance of the blend being the styrene and hydrocarbon block copolymer.

When using oil modified SEBS it may be desirable, though not critical, to use a high melt strength polypropylene as a blend component. Suitable polypropylene and SEBS containing blends include: (1) precompounded blends of PP and SEBS sold by Wittenburg under the trade name CAWITON and particularly grades PR 3670E, PR5526 and PR4977; (2) from 90-98% by weight KRATON G2705 with 2-10% Basell PROFAX PF 611 high melt strength polypropylene; (3) 75% KRATON G2705 with 23% Basell PROFAX SA 861 random copolymer of propylene and ethylene with 2% Basell PROFAX PF-611 which is high melt strength PP; and (4) precompounded blend of PP/SEBS sold by J-Von under grade 70585 E.

In another preferred form of the invention, the tubing will be fabricated from a single m-ULDPE resin or a blend of m-ULDPE resins. One particularly suitable m-ULDPE resin is sold by DuPont-Dow under the trademark ENGAGE® and even more particularly, ENGAGE® 8003 (density 0.885 g/cc). It is also contemplated blending more than one m-ULDPE resins. Such resins and tubings and film made therefrom are more fully set forth in U.S. Pat. No. 6,372,848 which is incorporated in its entirety herein by reference and made a part hereof.

It is also contemplated fabricating tubing from polybutadienes or blends of polybutadiene resins described above.

For certain applications, it is desirable the tubing heat upon being exposed to a laser beam. Laser responsive tubing can be assembled into medical fluid delivery sets as set forth in U.S. patent application Ser. No. 10/061,835 and Docket Nos. DI-5771A and DI-5771B which are incorporated herein by reference and made a part hereof. Because the suitable non-PVC containing polymers and polymer blends are typically not laser responsive, one must incorporate into the polymer or polymer blend a laser responsive component. Suitable laser-responsive components include dyes, colorants and/or pigments. In a more preferred form of the invention, the laser responsive material is a dye and more preferably an organic dye having a functional group that is responsive to a laser beam at a wavelength, or a narrow range of wavelengths, within a range of wavelengths in the near infrared spectrum and more preferably from about 700 nm to about 1500 nm. Representative functional groups include polymethine, porphine, indanthrene, quinone, di- and tri-phenylmethane, and metal complexed dithiol dyes. In a preferred form of the invention, the dye will have an absorptivity of higher than about 50 (optical density/gram) when exposed to a laser beam providing light in the frequency range in which the dye is responsive. In a preferred form of the invention, the dye is responsive to a laser beam at peak wavelengths from about 780 nm to about 810 nm and generates sufficient heat over a short period of time to allow for melting of the non-PVC polymer or polymer blend. What is meant by short period of time is less than 15 seconds.

The dyes are preferably sparingly soluble or insoluble in an aqueous medium including water, saline solutions, dextrose solutions, lipid containing solutions and protein containing solutions so if they form a part of the solution contact layer they will not readily leach into the solution in a significant or deleterious amount. The dyes are also preferably thermally stable at temperatures reached during extrusion processing of the polymer or polymer blend. Suitable dyes are sold by Epolin Inc. under the trade name EPOLIGHT 4121 and 4149. When using a laser responsive material with an absorption of higher than about 50, only low quantities of such dye material is required and typically is added to the tubing blend in an amount from about 20 ppm to about 2000 ppm, more preferably from about 100 ppm to about 1500 ppm and most preferably from about 200 ppm to about 1000 ppm. It is contemplated using a laser responsive material having an absorptivity of less than 50 but one would have to use higher concentrations of the laser responsive material. It is also contemplated using other dyes that are not responsive to the laser but are used for color coding purposes described above.

In another preferred form of the invention, the laser responsive material will be applied to a surface of materials to be joined instead of incorporating the laser responsive material into the blend. To this end, the laser responsive material is dissolved or suspended in a suitable carrier or solvent, and, in this form can be applied specifically to selected portions of the surfaces to be joined. The laser responsive material can be applied by dipping the surfaces to be joined into the laser responsive material, or the laser responsive material can be brushed on, sprayed on, printed on or the like.

The tubings of the present invention can be manufactured by any known polymer processing technique, but, in a preferred form of the invention, is formed by extrusion, coextrusion or injection molding. Such tubings are soft, flexible, kink resistant, have a good touch feeling (haptics), and are capable of being sterilized by steam sterilization, gamma ray exposure or gas phase sterilization techniques such as by ethylene oxide (EtO) exposure or hydrogen peroxide exposure.

Tubing Connector

Figure 3:
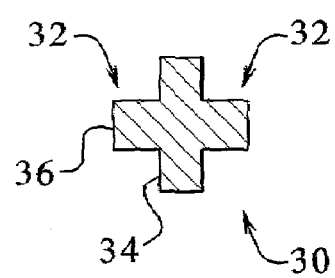
FIG. 3 is a plan view in cross section of a tubing coupler.
Figure 4:
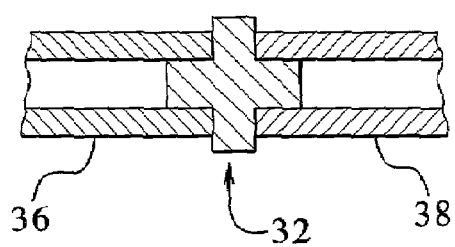
FIG. 4 is a plan view in cross section of the tubing coupler of FIG. 3 connecting two tubings of dissimilar material.

FIG. 3 shows a tubing coupler 30 having opposed tubing mounting portions 32, a tubing stop 34 and a fluid pathway 36 therethrough. As shown in FIG. 4, the coupler can be used to connect a first tubing 36 to a second tubing 38 where the first and second tubings are incompatible with one another. The tubing mounting portions 32 can have a tapered portion at its distal end for ease of mounting a tubing thereto. The surface of the coupler can be textured or have a matte finish for ease of mounting of the tubing. The tubing mounting portions 32 are shown to have relatively the same length but could have different lengths without departing from the scope of the present invention. It is also contemplated the tubing mounting portions 32 can have ridges or other protuberances for heat concentrating or enhancing an interference fit between the tubing and the tubing mounting portions 32.

The tubing mounting portions 32 are shown to be concentrically mounted with respect to one another and with respect to the fluid pathway 36. It is contemplated the coupler can have numerous shapes where the tubing portions 32 are not concentrically disposed with respect to one another. It is contemplated one tubing mounting portion can have a first axis and the other tubing mounting portion will have a second axis transverse to the first axis. What is meant by transverse is one axis extends in a direction to intersect the second axis even if the axis will not intersect it. It is also contemplated the coupler can have more than two tubing mounting portions, more than one tubing stop and more than one fluid pathway. It is desirable the tubing when attached to the coupler have a bond strength in excess of 15 lbf when tested by a pull test. An assembly fails the pull test if the tubing breaks or become detached from the coupler at a pull force below 15 lbf.

The connector is capable of being sterilized by steam sterilization (autoclave), gamma ray exposure or gas phase sterilization techniques such as by ethylene oxide (EtO) exposure or hydrogen peroxide exposure.

Bushing

Figure 5:
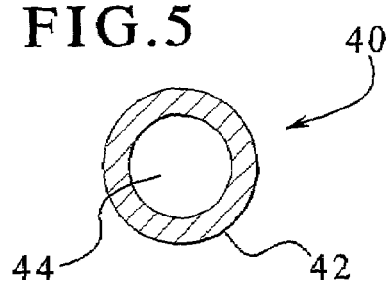
FIG. 5 is an end view in cross section of a bushing of the present invention.
Figure 6:
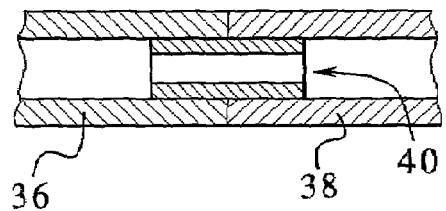
FIG. 6 is a plan view in cross section of the bushing of FIG. 5 connecting two tubings of dissimilar material.

FIG. 5 shows a bushing 40 having a sidewall 42 and a passageway 44. The bushing 40 is generally cylindrical in cross-sectional shape. FIG. 6 shows the bushing 40 connecting the first tubing 36 to the second tubing 38. The bushing 40 is shown mounted in the fluid pathway of the tubing but could also be dimensioned to receive the tubing in passageway 44 or a combination of one tubing being received in the fluid passageway 44 while the second tubing is inserted into the fluid passageway of the tubing.

Layer of a Multilayer Film

Figure 7:
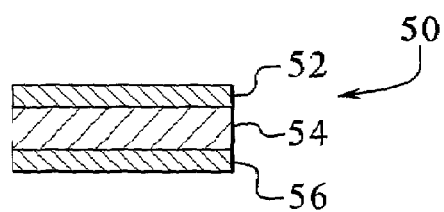
FIG. 7 is a multilayer film having two dissimilar materials being joined by a polymer blend of the present invention.

FIG. 7 shows a multilayer film 50 having a first layer 52, a coupling layer 54 and a second layer 56 where the first layer 52 and the second layer 54 are adhesively incompatible. The layers can be made from any of the polymers described above. In a preferred form of the invention the first layer 52 is made from PVC and the second layer 56 is made from a polyolefin. The coupling layer 54 is made from the above-described polymer blend and joins together the two layers of incompatible material. The film 50 can be formed by a coextrusion process, by lamination or other suitable techniques.

The film is capable of being sterilized by steam sterilization, gamma ray exposure or gas phase sterilization techniques such as by ethylene oxide (EtO) exposure or hydrogen peroxide exposure.

EXAMPLES

Example 1

A coupler was injection molded from a two component polymer blend of 50% HYTREL® 5556 WITH 50% BYNEL 1123. The blend components were pellitized with a 1½ inch David Standard twin screw extruder and injected molded with a 25 ton Arburg injection molding machine. A first tubing of PVC was slid over a first tubing mounting portion and attached to the coupler by radio frequency sealing. A second tubing was fabricated a polymer blend of Cawiton PR 3670 with 200 ppm dye (Epolin 4121). The components were blended in a David Standard twin screw extruder and extruded through a die to a wall thickness 0.039 inches, ID of 0.157 inches, OD of 0.235 inches. The second tubing was slid over a second tubing mounting portion of the coupler and then autoclaved at 121° C. for one hour. The assembly was allowed to cool and the first tubing and the second tubing were pulled until the tubing broke or until it became detached from the coupler and the force required to do so was measured respectively at 29.3 lbf and 29.4 lbf.

Example 2

A coupler was injection molded as set forth in Example 1 from a three-component polymer blend of 30% polypropylene (Solvay KS 490), 40% polyester elastomer (HYTREL® 5556) and 30% anhydride modified EVA (BYNEL 3810). As in Example 1, a first tubing of PVC was slid over a first tubing mounting portion and sealed thereto using radio frequency sealing. A second tubing was fabricated as set forth in Example 1 and was slid over a second tubing mounting portion. The assembly was autoclaved at 121° C. for one hour. The assembly was allowed to cool and the first tubing and the second tubing were pulled until the tubing broke or until it became detached from the coupler and the force required to do so was measured respectively at 48.2 lbf and 34.3 lbf.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim:

1. A polymer blend comprising:
   a first component of a propylene containing polymer in an amount by weight of the blend from about 25% to about 35%;
   a second component selected from the group consisting of polyesters, polyester elastomers, and polyurethanes, the second component present in an amount by weight of the blend of from about 35% to about 45%; and
   a third component of an ethylene vinyl acetate copolymer in an amount by weight of the blend from about 25% to about 35%.

2. The blend of claim 1, wherein the propylene containing polymer is selected from the group consisting of homopolymers of polypropylene and copolymers of polypropylene.

3. The blend of claim 2, wherein the homopolymer of polypropylene has a stereochemistry selected from the group consisting of isotactic, syndiotactic, atactic, hemiisotactic and stereoblock.

4. The blend of claim 2, wherein the copolymer of polypropylene is selected from the group consisting of random copolymers and block copolymers.

5. The blend of claim 2, wherein the copolymer of polypropylene is obtained by polymerizing a propylene monomer with an α-olefin having from 2 to 20 carbons.

6. The blend of claim 2, wherein the copolymer of polypropylene is selected from the group of random copolymers with ethylene and block copolymers with ethylene.

7. The blend of claim 1, wherein the polyester elastomer has a first segment of polybutylene terephthalate and a second segment of polyether glycols.

8. The blend of claim 1, wherein the polyurethane is obtained by reacting a diisocyanate with a chain extender wherein the diisocyanate is selected from the group consisting of: diphenylmethane diisocyanate, toluene diisocyanate, hexylene diisocyanate, and isophorone diisocyanate and wherein the chain extenders are selected from the group consisting of: diol type, diamine type, polyester containing polyols and polyether containing polyols.

9. The blend of claim 1, wherein the ethylene vinyl acetate copolymer has a vinyl acetate content of from about 8% to about 40% by weight.

10. The blend of claim 9, wherein the ethylene vinyl acetate copolymer has a modifier group associated therewith and selected from the group consisting of: aromatic hydrocarbons, carbon dioxide, monoethylenically unsaturated hydrocarbons, acrylonitriles, vinyl ethers, vinyl esters, vinylamides, vinyl ketones, vinyl halides, epoxides, carboxylic acids and anhydride derivatives thereof.

11. The blend of claim 10, wherein the modifier group is maleic anhydride.

12. An article for joining a first tubing of a first material to a second tubing of a second material where the second material is incompatible with the first tubing, the article comprising:
a body of a first polymer blend comprising: a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

13. The article of claim 12, wherein the body has opposed ends, each end having a tubing mounting portion.

14. The article of claim 13, wherein the tubing mounting portion is adapted to fit within a fluid passageway of a tubing.

15. The article of claim 14, wherein the body has a tubing stop intermediate the opposed ends.

16. The article of claim 15, wherein the tubing stop and the tubing mounting portion define a fluid passageway.

17. The article of claim 16, wherein the tubing stop has a first outer diameter and the tubing mounting portion has a second diameter smaller than the first diameter.

18. The article of claim 13, wherein a first tubing of a first material is attached to one of the tubing mounting portion and a second tubing of a second material incompatible with the first tubing material attached to the opposite tubing mounting portion.

19. The article of claim 18, wherein the tubing mounting portions and the tubing stop are concentrically disposed.

20. The article of claim 18, wherein the first material is a polyvinylchloride.

21. The article of claim 20, wherein the second material contains a polyolefin.

22. The article of claim 21, wherein the second material is a second polymer blend.

23. The article of claim 22, wherein the second polymer blend comprises:
a fourth component of a material not thermally responsive to a laser beam and selected from the group consisting of polyolefins, ethylene and lower alkyl acrylate copolymers, ethylene and lower alkyl substituted alkyl acrylate copolymers, ethylene vinyl acetate copolymers, polybutadienes, polyesters, polyamides, and styrene and hydrocarbon copolymers;
a fifth component of a laser responsive material having low solubility in aqueous medium; and
the blend being sufficiently thermally responsive to exposure to a laser beam having a wavelength within a range of wavelengths from about 700 nm to about 1500 nm to melt upon exposure to the laser beam for a short period of time.

24. The article of claim 23, wherein the fourth component is obtained from a monomer of an α-olefin having from 2 to 20 carbons.

25. The article of claim 23, wherein the fourth component is selected from the group of propylene containing polymers and ethylene containing polymers.

26. The article of claim 25, wherein the fourth component is selected from the group consisting of first homopolymers of polypropylene and first copolymers of polypropylene.

27. The article of claim 26, wherein the first homopolymer of polypropylene has a stereochemistry selected from the group consisting of isotactic, syndiotactic, atactic, hemiisotactic and stereoblock.

28. The article of claim 26, wherein the first copolymer of polypropylene is selected from the group consisting of random copolymers and block copolymers.

29. The article of claim 26, wherein the first copolymer of polypropylene is obtained by polymerizing a propylene monomer with an α-olefin having from 2 to 20 carbons.

30. The article of claim 26, wherein the first copolymer of polypropylene is selected from the group of random copolymers with ethylene and block copolymers with ethylene.

31. The article of claim 24, wherein the polyolefin has a heat of fusion from about 60 joules/g to about 160 joules/g.

32. The article of claim 24, wherein the polyolefin has a peak melting point temperature of less than about 165° C.

33. The article of claim 23, wherein the fourth component is a third polymer blend of a second polypropylene and a styrene and hydrocarbon copolymer.

34. The article of claim 33, wherein the styrene and hydrocarbon copolymer is selected from the group of random copolymers of styrene and hydrocarbon and block copolymers of styrene and hydrocarbon.

35. The article of claim 34, wherein the styrene and hydrocarbon block copolymer is selected from the group consisting of di-block copolymers, tri-block copolymers, multi-block and star block copolymers.

36. The article of claim 35, wherein the styrene and hydrocarbon block copolymer is oil modified.

37. The article of claim 33, wherein the third blend includes a third polypropylene, the third polypropylene having high melt strength.

38. The article of claim 37, wherein the third blend has from about 10% to about 50% by weight of the sum of the weights of the second polypropylene and the third polypropylene and the styrene and hydrocarbon copolymer constituting the remaining weight portion of the third blend.

39. The article of claim 24, wherein the fourth component is selected from the group consisting of homopolymers of ethylene and copolymers of ethylene.

40. The article of claim 39, wherein the copolymers of ethylene are obtained by polymerizing ethylene monomers with an α-olefin having from 3 to 20 carbons.

41. The article of claim 39, wherein the copolymers of ethylene are obtained by polymerizing ethylene monomers with an α-olefin having from 4 to 8 carbons.

42. The article of claim 39, wherein the copolymers of ethylene have a density of less than about 0.915 g/cc.

43. The article of claim 39, wherein the copolymers of ethylene have a density of less than about 0.900 g/cc.

44. The article of claim 39, wherein the fourth component is an ultra-low density polyethylene.

45. The article of claim 41, wherein the copolymer of ethylene is obtained utilizing a single-site catalyst.

46. The article of claim 41, wherein the copolymer of ethylene is obtained utilizing a metallocene catalyst.

47. The article of claim 23, wherein the fourth component is a polybutadiene.

48. The article of claim 12, wherein the laser responsive material has a functional group selected from the group polymethine, porphine, indanthrene, quinone, di- and triphenylmethane, and metal complexed dithiol dyes.

49. The article of claim 48, wherein the laser responsive material is a dye.

50. The article of claim 49, wherein the dye is thermally stable at temperatures reached during extrusion processing of the blend.

51. The article of claim 12 is formed by injection molding.

52. The article of claim 12 is capable of being sterilized by gamma rays, steam autoclave and gas phase sterilization.

53. A polymer blend comprising:
a first component selected from the group consisting of polyesters, polyester elastomers, and polyurethanes, the first component present in an amount by weight of the blend of from about 40% to about 60%; and
a second component of an ethylene vinyl acetate copolymer in an amount by weight of the blend from about 60% to about 40%, the ethylene and vinyl acetate copolymer having a modifier group associated therewith and selected from the group consisting of aromatic hydrocarbons, carbon dioxide, monoethylenically unsaturated hydrocarbons, acrylonitriles, vinyl ethers, vinyl esters, vinylamides, vinyl ketones, vinyl halides, epoxides, carboxylic acids and anhydride derivatives thereof.

54. The blend of claim 53, wherein the polyester elastomer has a first segment of polybutylene terephthalate and a second segment of polyether glycols.

55. The blend of claim 53, wherein the polyurethane is obtained by reacting a diisocyanate with a chain extender wherein the diisocyanate is selected from the group consisting of: diphenylmethane diisocyanate, toluene diisocyanate, hexylene diisocyanate, and isophorone diisocyanate and wherein the chain extenders are selected from the group consisting of: diol type, diamine type, polyester containing polyols and polyether containing polyols.

56. The blend of claim 53, wherein the ethylene and vinyl acetate copolymer has a vinyl acetate content of from about 8% to about 40% by weight.

57. The blend of claim 53, wherein the modifier group is maleic anhydride.

58. A multilayer film and tubing comprising:
a first layer of a first material;
a second layer of a second material that is adhesively incompatible with the first layer; and
a third layer joining the first layer to the second layer, the third layer of a blend comprising a first component of a propylene containing polymer in an amount by weight of the blend from about 25% to about 35%; a second component selected from the group consisting of polyesters, polyester elastomers, and polyurethanes, the second component present in an amount by weight of the blend of from about 35% to about 45%; and a third component of an ethylene vinyl acetate copolymer in an amount by weight of the blend from about 25% to about 35%.

59. The film and tubing of claim 58, wherein the first layer is PVC.

60. The film and tubing of claim 59, wherein the second layer contains a polyolefin.

61. The film and tubing of claim 58, wherein the first layer contains a first polyolefin.

62. The film and tubing of claim 61, wherein the second layer contains a second polyolefin which is adhesively incompatible with the first polyolefin.

63. The film and tubing of claim 58, wherein the tubing is a multiple lumen tubing.

* * * * *